May 2, 1967

H. WULLKOPF 3,317,872

ANNULAR TWO-POLE PERMANENT MAGNETS FOR
DIRECT-CURRENT MOTORS HAVING THE
FREE-POLE ARMATURES

Filed Sept. 21, 1964

2 Sheets-Sheet 1

INVENTOR.
H. WULLKOPF
BY
Frank R. Lifain
AGENT

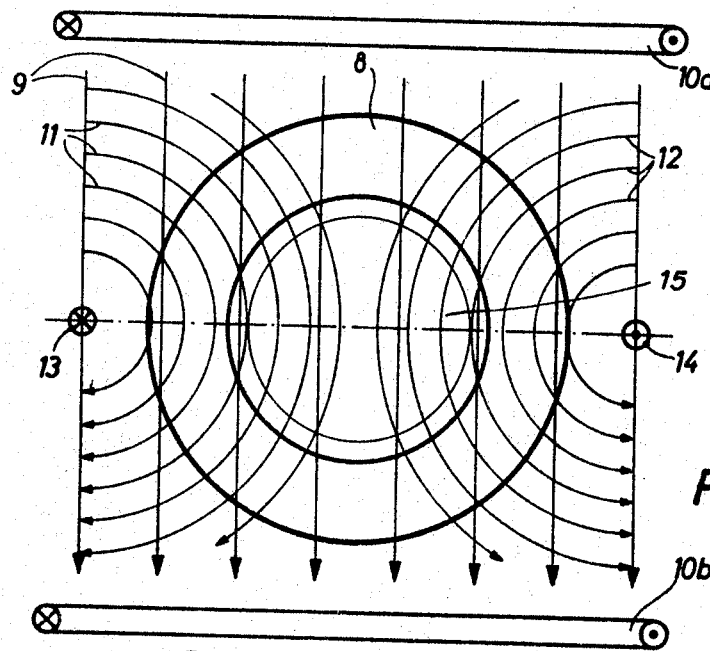
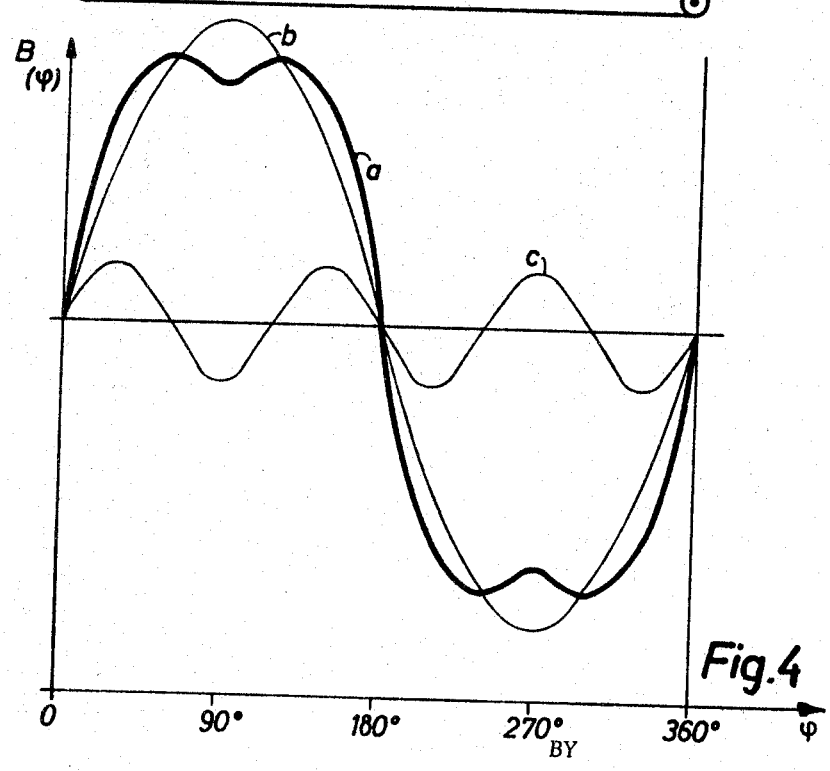
Fig. 3
Fig. 4

United States Patent Office 3,317,872
Patented May 2, 1967

3,317,872
ANNULAR TWO-POLE PERMANENT MAGNETS FOR DIRECT-CURRENT MOTORS HAVING THE FREE-POLE ARMATURES
Hellmuth Wullkopf, Hamburg-Gross, Flottbek, Germany, assignor to North American Philips Company, Inc., New York, N.Y., a corporation of Delaware
Filed Sept. 21, 1964, Ser. No. 397,733
Claims priority, application Germany, Sept. 24, 1963, P 32,644
3 Claims. (Cl. 335—284)

The invention relates to an annular two-pole permanent magnet, particularly to a magnet made from barium hexaferrite, for use in direct current motors having three-pole armatures.

Figure 1:
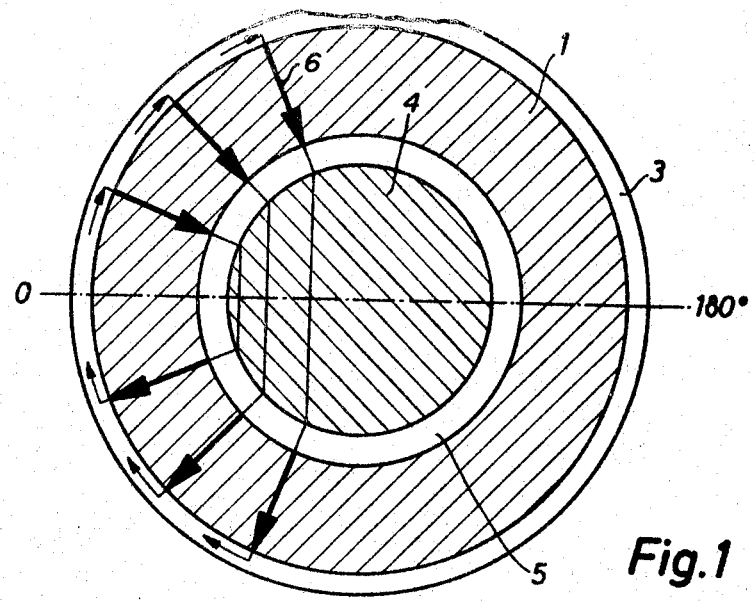
Figure 2:
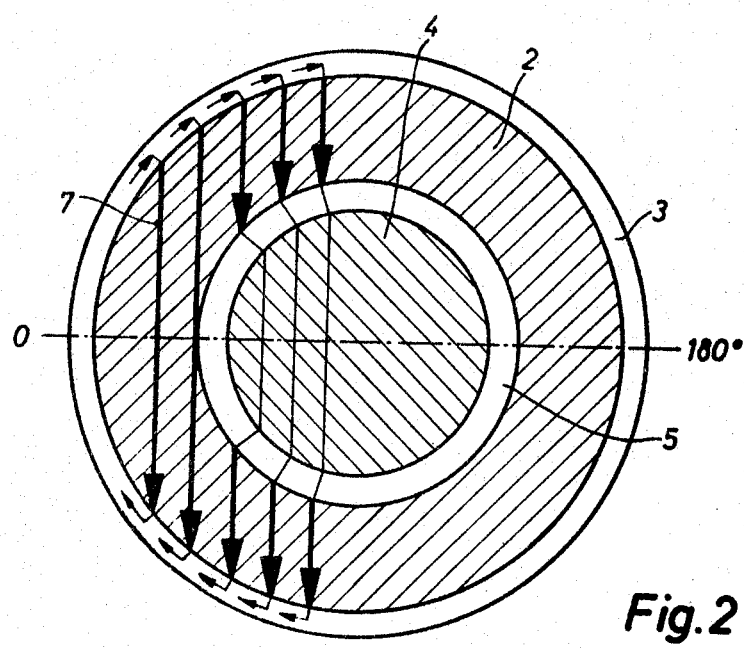

The invention will be described with reference to the accompanying drawing in which:

FIGS. 1 and 2 are diagrammatic sectional views of direct-current motors known in the art, FIG. 3 is a diagrammatic sectional view of a device for magnetizing a magnet according to the invention; and, FIG. 4 is a curve showing the variation of magnetic induction about the periphery of the magnet of FIG. 3.

In FIGS. 1 and 2 the D.C. motors have annular magnets 1 and 2 respectively which are made of barium hexaferrite and are magnetized radially (FIG. 1) and diametrically (FIG. 2). Reference numeral 3 designates an iron short-circuiting plate and reference numeral 4 an armature. The air gap between the permanent magnet 1 or 2 respectively and the armature 4 is designated by 5. In the motor shown in FIGURE 1 the lines of magnetic force 6 pass radially through the magnet 1 and in the motor shown in FIGURE 2 the lines of magnetic force 7 pass diametrically through the magnet 2.

A specific problem in D.C. motors, particularly small motors for record players or battery-energized apparatus, is the so-called sticking of the armature when no current is supplied thereto, which sticking occurs preferentially in particular positions determined by the magnetic field and gives rise to irregular running of the motor. Starting of such a motor requires an additional torque. This torque is required to overcome the forces which hold the armature in its preferential position. Apart from the irregular running the sticking positions do not influence the motor when running.

It is known that D.C. motors having diametrical magnetization of the annular magnet have no sticking positions. In such motors the induction around the permanent magnet is truly sinusoidal. In contradistinction thereto, motors having radially magnetized armatures have marked sticking positions. On the other hand, with otherwise equal dimensions of a motor radial magnetization enables an armature flux to be produced which exceeds the armature-flux obtainable with diametrical magnetization by more than 50%. Thus, diametrical magnetization provides motors having no sticking positions and a comparatively small armature flux and hence a small output torque, whereas radial magnetization provides motors having an armature flux which is greater by more than 50%.

According to the invention in a motor having no or substantially negligible sticking positions and yet a large armature flux is obtainable by providing the permanent magnet around its entire periphery with a magnetization the radial component of the induction of which comprises at least substantially only a sinusoidal fundamental wave and its third harmonic.

The invention is based on the discovery that for a motor having no sticking positions the surface induction B, for example, over the inner cylindrical surface of the annular magnet as a function of the angle $\varphi$ may be expressed approximately by the following formula:

$$B(\varphi) = CB_r(1.14 \sin \varphi + 0.23 \sin 3\varphi)$$

In this formula $B_r$ is the remanent induction of the material of the magnet and C is a constant dependent on the geometrical proportions of the motor.

According to the invention, to achieve a maximum armature flux the amplitude ratio between the fundamental wave and the third harmonic must be at least 2:1 but preferably approximately 5:1.

A motor having an annular magnet magnetized in accordance with the invention has substantially no sticking positions and produces an armature flux which is about intermediate between armature flux of a radially magnetized annular magnet and the armature flux of a diametrically magnetized annular magnet. Compared with a motor having a diametrically magnetized permanent magnet and hence no sticking positions, an annular magnet magnetized in accordance with the invention provides an increase in the armature flux of about 20% to 25%.

If the magnetic induction over the inner cylindrical surface is measured, for example, by means of a Hall probe, a variation is found as shown in FIGURE 4 by curve $a$ drawn as a heavy full line. This curve $a$ is constituted by a sinusoidal fundamental wave $b$ and its third harmonic $c$.

An annular magnet may be provided with a magnetization according to curve $a$ in a variety of manners.

A method of magnetizing a permanent magnet in accordance with the invention is characterized in that the annular permanent magnet is simultaneously exposed to a diametrical homogeneous magnetic field and two circular magnetic fields which are produced in this case by two conductors which have opposite current directions and lie in a plane passing through the axis of the annular magnet at right angles to the homogeneous field and are arranged both diametrically and parallel to this axis.

It may be of advantage to arrange a soft-iron core in the permanent annular magnet during the magnetizing process.

FIGURE 3 shows an arrangement by means of which an annular magnet may be magnetized in accordance with the invention.

An annular magnet 8 made of barium hexaferrite ($\mu \approx 1$) is subjected to a diametrical homogeneous magnetic field 9 produced by two series-connected annular coils 10a and 10b having the same current direction. The annular coils 10 are shown schematically only since such an arrangement is known. Two circular magnetic fields 11 and 12 produced by two conductors 13 and 14 arranged externally of the permanent magnet 8 parallel to its axis are superposed on the homogeneous diametrical magnetic field 9. The coils 10 and the conductors 13 and 14 are preferably connected in series and advantageously consist of a single length of wire. The superposition of the mganetic fields 9, 11 and 12 produces in the annular magnet 8 a resultant magnetization the variation of the lines of force of which is substantially intermediate the variation with radial magnetization and that with diametrical magnetization when the magnetizing coils are connected in the afore described manner and are traversed, for example, by a current pulse produced by the discharge of a capacitor.

Along the circumference of the magnet the resultant magnetization has an induction variation which corresponds at least approximately to the curve $a$ of FIGURE 4. In order to cause the variation of the induction to approximate still closer to the ideal shape a soft-iron core 15 may be arranged in the permanent annular magnet 8 during the magnetizing process. The annular magnet need not be in one piece but may comprise a plurality of ring segments.

What is claimed is:
1. A method of peripherally magnetizing an annular permanent magnet body to produce therein two poles and a magnetization having a radial component which comprises a fundamental wave and the third harmonic thereof comprising the steps of placing said permanent magnet body into a diametrical homogeneous magnetic field and two oppositely-directed circular magnetic fields which lie in a plane passing through the axis of the permanent magnet body.

2. A method as claimed in claim 1 in which the circular fields are produced by two conductors which are located in a plane passing through the axis of the permanent magnet body at right angles to the diametral field, each of said conductors carrying an electric current passing in opposite directions.

3. A method as claimed in claim 1 in which during magnetization a soft-iron core is positioned in the permanent annular magnet.

References Cited by the Examiner
UNITED STATES PATENTS

| | | | |
|---|---|---|---|
| 1,335,453 | 3/1920 | Nilson | 317—203 |
| 2,442,808 | 6/1948 | Granberry | 317—203 |
| 2,775,716 | 12/1956 | Valeton et al. | 310—156 |
| 2,981,871 | 4/1961 | Westmijze | 317—201 |
| 3,126,493 | 3/1964 | Honsinger | 310—156 |

OTHER REFERENCES

Ceramic Permanent Magnets: Wireless World, December 1960, pp. 595–598.

BERNARD A. GILHEANY, *Primary Examiner.*

G. HARRIS, *Assistant Examiner.*